Patented June 14, 1927.

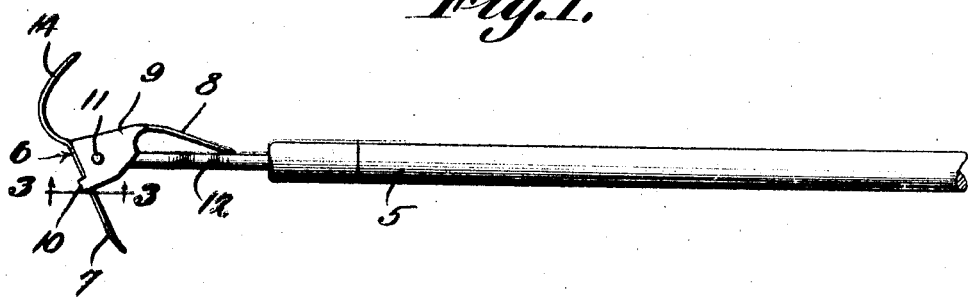
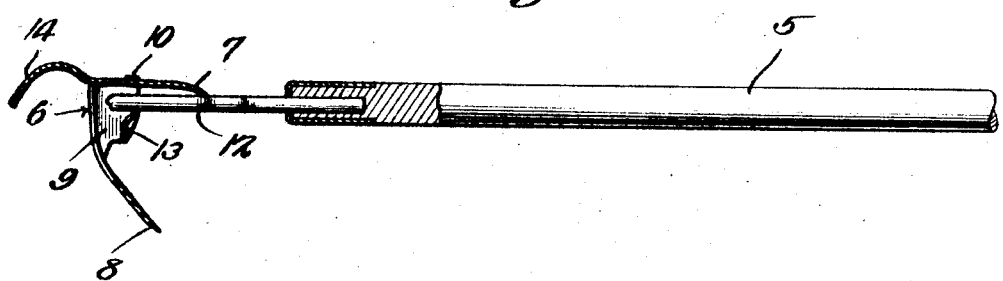
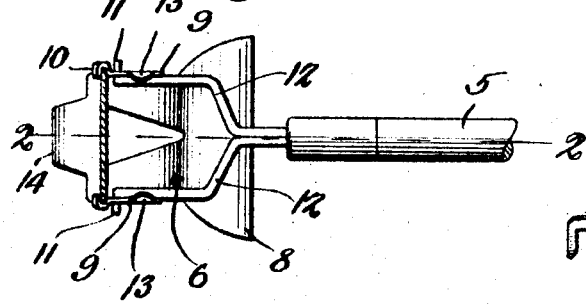
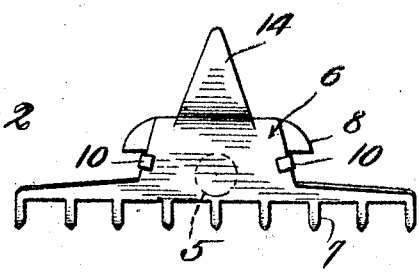

1,632,260

UNITED STATES PATENT OFFICE.

ROBERT B. WOODALL, OF MALVERN, ARKANSAS.

GARDEN TOOL.

Application filed September 15, 1925. Serial No. 56,494.

This invention relates to an agricultural implement, the primary object of the invention being to provide a combined rake, hoe and planting implement all of which are supported by a single handle.

An object of the invention is to provide a device of this character wherein the blade portion or hoe and rake portion extend rearwardly to engage the supporting arms that secure the head to the handle, means being provided on the head to cooperate with the blade or rake portion to hold the head in its positions of adjustment.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of an agricultural implement showing the rake blade or head as moved to its active position.

Figure 2 is a sectional view taken on line 2—2 of Figure 3, with the hoe blade moved to active position.

Figure 3 is a sectional view taken on line 3—3 of Figure 1.

Figure 4 is a front elevational view of the head.

Referring to the drawing in detail, the reference character 5 indicates the handle of the tool which may be of any suitable construction and length.

The head of the tool is indicated generally by the reference character 6 and is preferably constructed of sheet metal, the same being formed in such a way as to provide a rake portion 7 and hoe portion 8, the hoe portion and rake portion extending at approximately right angles with respect to each other so that either implement may be brought into use, the opposite implement resting on the securing arms that secure the head to the handle.

Flanges 9 form a part of the head and are bent downwardly to engage the rake portion 7, it being understood that the flanges 9 are formed integral with the hoe portion. Fingers 10 are formed on the flanges 9 and are adapted to be bent around the rake portion in a manner as shown by Figure 4, to secure the hoe portion and rake portion in proper positions with respect to each other.

As shown, openings are formed in the flanges 9 for the reception of the right angled extremities 11 of the connecting arms 12 that extend into the handle 5 to the end that the head is pivotally connected to the handle portion to permit of the adjustment as described.

Extending inwardly from the flanges 9 are lips 13 that are disposed substantially intermediate the ends of the inner side edges of the flanges, the lips lying in the path of travel of the arms 12 when they are being moved from one position to the other position.

Stamped from the sheet metal of which the head is constructed, is a curved finger 14 that is tapered so that it may be used for forming openings in the soil to facilitate planting.

From the foregoing it will be seen that the head may be readily swung from a position as shown by Figure 1, to a position as shown by Figure 2 whereupon the tool may be converted into either a hoe or rake at the will of the operator. It is obvious that a binding action is set up between the lips 13 and the arms 12 to the end that the head will be locked in its positions of adjustment.

I claim:—

1. In an agricultural tool, a handle portion, a pair of spaced resilient arms extending from one end of the handle portion and having laterally extended extremities, a head embodying blades extended at substantially right angles with respect to each other, pivotally supported on the laterally extended extremities of the arms so that the heads may be moved to bring either blade to its active position, flanges formed integral with one of the blades and extending laterally therefrom, fingers on the flanges and engaging the adjacent blade to secure the blades against movement with respect to each other, and lips formed on the edges of the flanges and adapted to engage the spaced arms when the head is moved to hold the head in its positions of adjustment.

2. In an agricultural tool, a handle portion, a pair of spaced resilient arms extending from one end of the handle portion, a head embodying blades extending at substantially right angles with respect to each other pivotally mounted on the arms, said head adapted to be moved to cause a blade to engage the arms, and means carried by the head and adapted to cooperate with the blade engaging the arms to hold the head in its adjusted position.

In testimony that I claim the foregoing as my own, I have hereto affixed my signature.

ROBERT B. WOODALL.